United States Patent
Kurian et al.

[11] Patent Number: 5,938,534
[45] Date of Patent: *Aug. 17, 1999

[54] RADIAL FREE MOTION DRIVELINE

[75] Inventors: Bradley S. Kurian, Perkiomenville; James C. Stiles, Reading, both of Pa.

[73] Assignee: Neapco, Inc., Pottstown, Pa.

[*] Notice: This patent is subject to a terminal disclaimer.

[21] Appl. No.: 09/063,447

[22] Filed: Apr. 21, 1998

Related U.S. Application Data

[63] Continuation of application No. 08/870,999, Jun. 6, 1997, Pat. No. 5,827,122.

[51] Int. Cl.$^6$ .................................. F16D 3/06; F16C 3/03
[52] U.S. Cl. ........................ 464/162; 403/359; 403/383; 464/140
[58] Field of Search ..................... 464/160, 162, 464/179, 182; 403/383, 359

[56] References Cited

U.S. PATENT DOCUMENTS

| | | | |
|---|---|---|---|
| 1,636,262 | 7/1927 | Troendly | 464/162 |
| 1,686,945 | 10/1928 | Abercrombie | 464/162 |
| 2,708,100 | 5/1955 | Sutliff | 403/359 |
| 3,621,945 | 11/1971 | Spry | 403/359 |
| 3,827,816 | 8/1974 | Knapp et al. | 403/359 |
| 3,995,914 | 12/1976 | Schardt et al. | 464/162 |
| 4,306,428 | 12/1981 | Calderon et al. | 464/162 |
| 4,693,136 | 9/1987 | Clerc et al. | 403/383 |
| 4,827,800 | 5/1989 | Pedersen et al. | 403/359 |
| 4,932,809 | 6/1990 | Kopp . | |
| 5,383,811 | 1/1995 | Campbell et al. | 464/162 |

FOREIGN PATENT DOCUMENTS

| 10180 | 12/1923 | Netherlands | 403/359 |
|---|---|---|---|

*Primary Examiner*—Eileen Dunn Lillis
*Attorney, Agent, or Firm*—Woodcock Washburn Kurtz Mackiewicz & Norris, LLP

[57] ABSTRACT

An adjustable length telescoping radial free motion driveline including a shaft slidable within a sleeve to slide axially with respect to each other which allows the driveline to elongate and shorten while still maintaining a fixed radial alignment. The shaft and mating sleeve are configured to allow for a fixed amount of radial motion between the shaft and sleeve that can be used by the installer to compensate for any misalignment between the two fixtures that the driveline is connected between. In one embodiment the shafting is square and the other the shafting is splined.

12 Claims, 4 Drawing Sheets

RADIAL FREE MOTION DRIVELINE

This application is a continuation of application Ser. No. 08/870,999 filed Jun. 6, 1997 now U.S. Pat. No. 5,827,122.

BACKGROUND OF THE INVENTION

The present invention relates to drivelines of the type for connecting a driving member to a driven member. Such drivelines include a shaft which is slid into a sleeve and allowed to slide axially with respect to one another. This motion is referred to as telescoping and allows a driveline to elongate and shorten while maintaining a fixed radial alignment. It is desirable to provide a radial free motion driveline that allows a fixed amount of radial motion between the shaft and sleeve that can be used by the installer to compensate for any misalignment between the driving and driven members that the driveline is connected between. Drivelines of the present type are particularly suitable for driving agricultural machinery from a power source.

SUMMARY OF THE INVENTION

The present invention is directed to an adjustable length telescoping radial free motion driveline having a driven end and a driving end. The driveline includes an elongated shaft having a predetermined external cross-sectional configuration and an elongated sleeve having a predetermined internal cross-sectional configuration complimentary to the external configuration of the shaft. The internal configuration of the sleeve is large than the external configuration of the shaft to permit the shaft and the sleeve to telescope with respect to each other. The internal configuration of the sleeve is shaped to permit the shaft to rotate to a predetermine angle with respect to the sleeve and thereafter to rotate with the sleeve whereby a fixed amount of radial free motion corresponding to the predetermined angle is provided between the shaft and the sleeve to compensate for any misalignment between the driving means and the driven means to which the driving end and the driven end of the driveline are to be connected and after connection permitting the driveline to elongate or shorten while maintaining a fixed radial alignment. In accordance with a further aspect of the invention one end of the sleeve is secured to one end of a tubular member. One end of the shaft remote from the sleeve is connected to a universal joint yoke and the other end of the tubular member is connected to a universal joint yoke for connecting the driving end and driven end of the driveline to the driving means and driven means. In accordance with another aspect of the invention the shaft is a substantially square external cross-sectional configuration. In accordance with another aspect of the invention the shaft is provided with an external spined cross-sectional configuration.

In the embodiment of the invention where the shaft has an external substantially square cross-sectional configuration, the shaft includes four sides and two pairs of diagonally opposite arcuate corners located on a circle having a first diameter. The sleeve has an internal substantially square cross-sectional configuration including two pairs of diagonally opposite arcuate corners located on a circle having a second diameter larger than the first diameter. A pair of flat surfaces interconnect the arcuate corners of the sleeve, each pair of the flat surfaces extending inwardly toward the center of the sleeve and each side of the shaft engages a corresponding one of the flat surfaces in each pair when the shaft is rotated through the predetermined angle.

In the embodiment where the shaft has an external splined cross-sectional configuration, the shaft includes a plurality of teeth and the sleeve has an internally splined cross-sectional configuration having the same number of teeth as the shaft. The spacing of the teeth on the shaft is greater than the spacing of the teeth on the sleeve, by an amount equal to the predetermined angle, wherein the teeth on the shaft engage the teeth on the sleeve when the shaft is rotated through the predetermined angle.

For a more detailed disclosure of the invention and for further objects and advantages thereof, reference is to be had to the following description taken in conjunction with the accompanying drawings.

PREFERRED EMBODIMENT OF THE INVENTION

Figure 1:
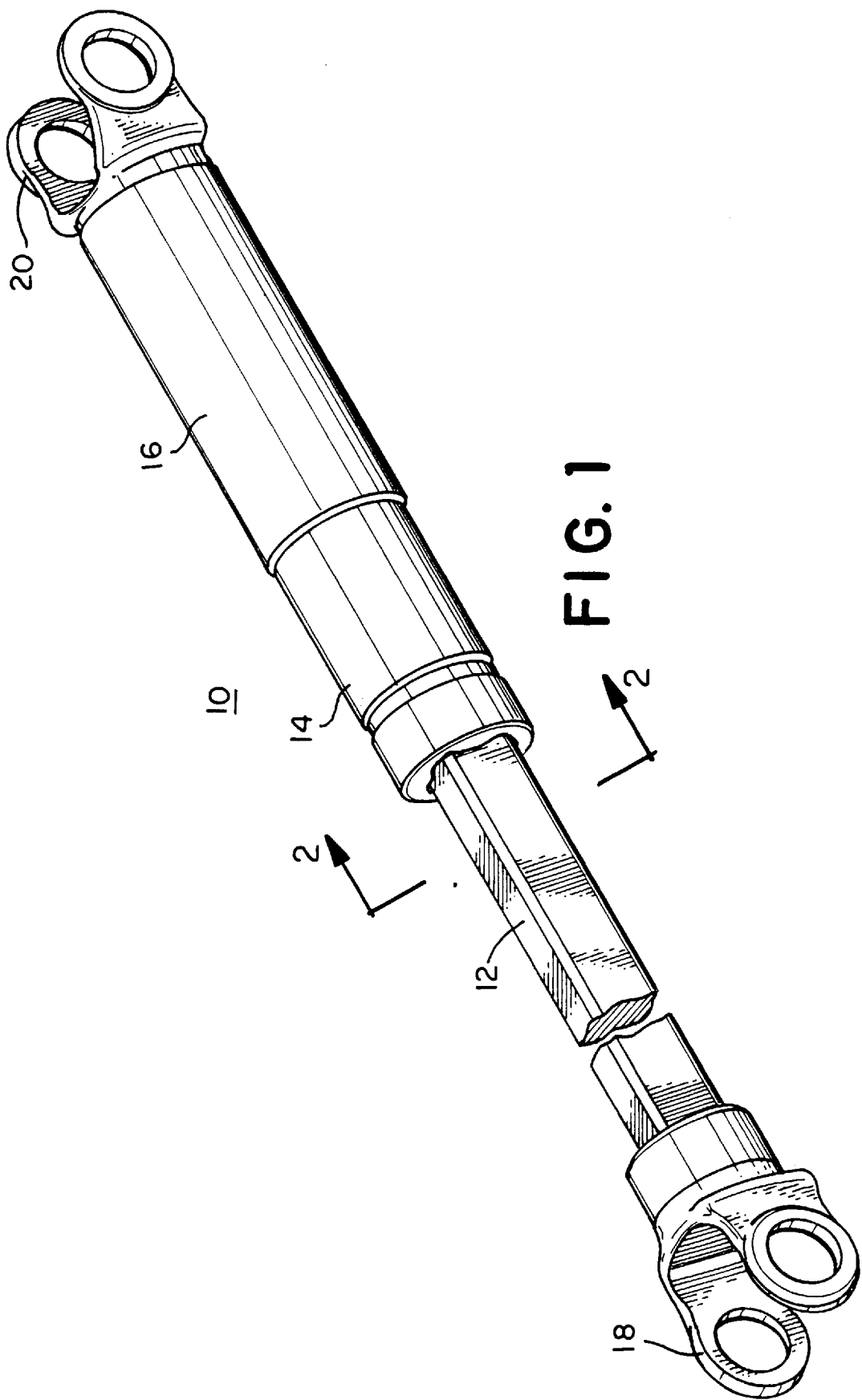
FIG. 1 is a perspective view of a radial free motion driveline according to the present invention.

Referring to FIG. 1 there is shown an adjustable length telescoping radial free motion driveline 10 having a driven end and a driving end embodying the present invention. The driveline 10 includes an elongated shaft 12 having a predetermined external cross-sectional configuration, FIG. 2, and an elongated sleeve 14 having a predetermined internal cross-sectional configuration, FIG. 2, complementary to the external configuration of the shaft. The internal configuration of the sleeve 14 is larger than the external configuration of the shaft 12 to permit the shaft 12 and sleeve 14 to telescope with respect to each other. The internal configuration of the sleeve 14 is shaped to permit the shaft 12 to rotate through a predetermined angle A, FIG. 2, with respect to the sleeve 14 and thereafter to rotate with the sleeve. With this arrangement a fixed amount of radial free motion corresponding to the predetermined angle A is provided between the shaft 12 and the sleeve 14 to compensate for any misalignment between a driving means and a driven means to which the driven end and the driving end of the driveline 10 are to be connected and after connection permitting the driveline to elongate or shorten while maintaining a fixed radial alignment.

In a telescoping driveline it is to be understood that either end of the driveline may be the driven end or the driving end depending on which end is connected to the driving means and which end is connected to the driven means. In a telescoping driveline such as driveline 10 the shaft 12 is usually the longer member and the sleeve 14 is the shorter member of the driveline. By way of example, the shaft 12 may vary in length from about 2 to 3 feet, depending upon the application, whereas the sleeve 14 is frequently shorter varying from 1 to 2 feet in length. As may be seen in FIG. 1, one end of the sleeve 14 is secured to one end of a tubular member 16. The tubular member 16 may be secured to the sleeve 14 by any suitable means such for example as by welding. The ends of drivelines are usually connected to universal joints. In FIG. 1, the end of the shaft 12 remote from the sleeve 14 is connected to a universal joint yoke 18 and the other end of the tubular member 16 is connected to a universal joint yoke 20 for connecting the driving end and the driven end of the driveline end to the driving means and driven means.

Figure 2:
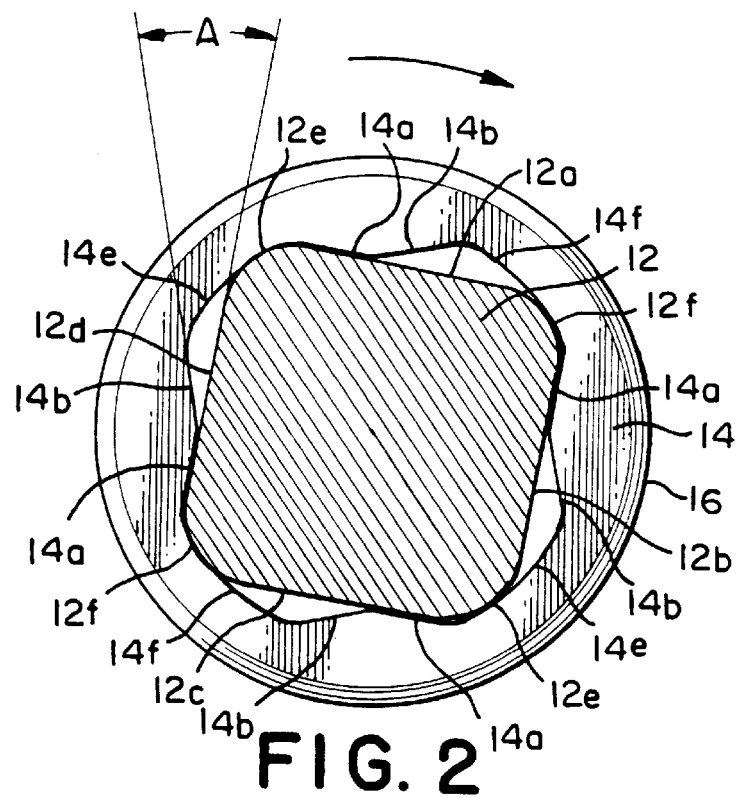
FIG. 2 is a cross-sectional view taken along the lines 2—2 in FIG. 1.

Referring to FIG. 2 it will be seen that the shaft 12 has an external substantially square cross-sectional configuration including four sides 12a, 12b, 12c, and 12d. The shaft 12 also has two pairs of diagonally opposite arcuate corners 12e and 12f located on a circle having a first diameter. The sleeve 14 has an internal substantially square cross-sectional configuration including two pairs of diagonally opposite arcuate corner 14e and 14f located on a circle having a second diameter larger than the first diameter referred to above with respect to the shaft 12. A pair of flat surfaces 14a, 14b, interconnect the arcuate corners 14e and 14f of the sleeve 14. Each pair of the flat surfaces 14a and 14b extend inwardly toward the center of the sleeve 14. Each side of the shaft 12 engages a corresponding one of the flat surfaces in each pair when the shaft 12 is rotated through the predetermined angle.

As shown in FIG. 2 when the shaft 12 is rotated clockwise in the direction of the arrow, the sides 12a, 12b, 12c and 12d of the shaft 12 respectively engage the flat surfaces 14a in each pair of flat surfaces on the sleeve 14. Thereafter, the shaft 12 and sleeve 14 rotate together. Thus it will be seen that alternate flat surfaces on the sleeve 14 are engaged by the sides of the shaft 12. The predetermined angle of rotation is illustrated by the angle A in FIG. 2. The preferred angle A is about 18° to 20°. In FIG. 2 the shaft 12 has rotated through the angle A from the position of the shaft shown in FIG. 3.

Figure 3:
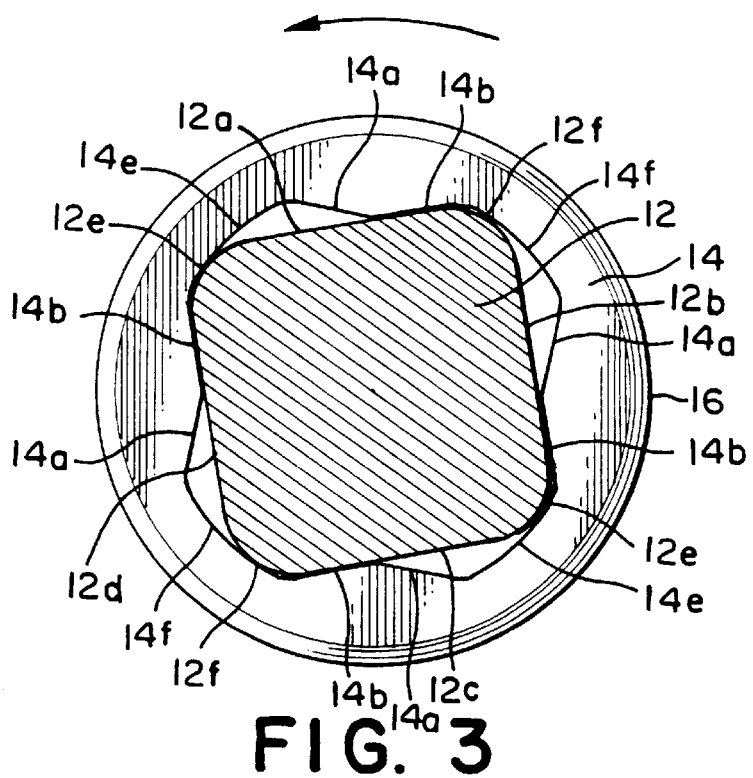
FIG. 3 is a cross-sectional view similar to FIG. 2 with the shaft rotated in the direction of the arrow through the predetermined angle shown in FIG. 2.

When the shaft 12 is rotated in the counter clockwise direction as shown by the arrow in FIG. 3, the shaft has also rotated through a predetermined angle corresponding to angle A. At this time the sides 12a, 12b, 12c and 12d of the shaft engage the other flat surface in each pair of flat surfaces on the sleeve 14 namely the surfaces 14b. When the shaft 12 engages these surfaces than the shaft 12 and sleeve 14 rotate together. Thus it will be seen that a fixed amount of radial free motion corresponding to the predetermined angel A is provided between the shaft 12 and the sleeve 14 to compensate for any misalignment between the driving means and the driven means to which the driven end and the driving end of the driveline are to be connected and after connection permitting the driveline to elongate or shorten while maintaining a fixed radial alignment.

Figure 4:
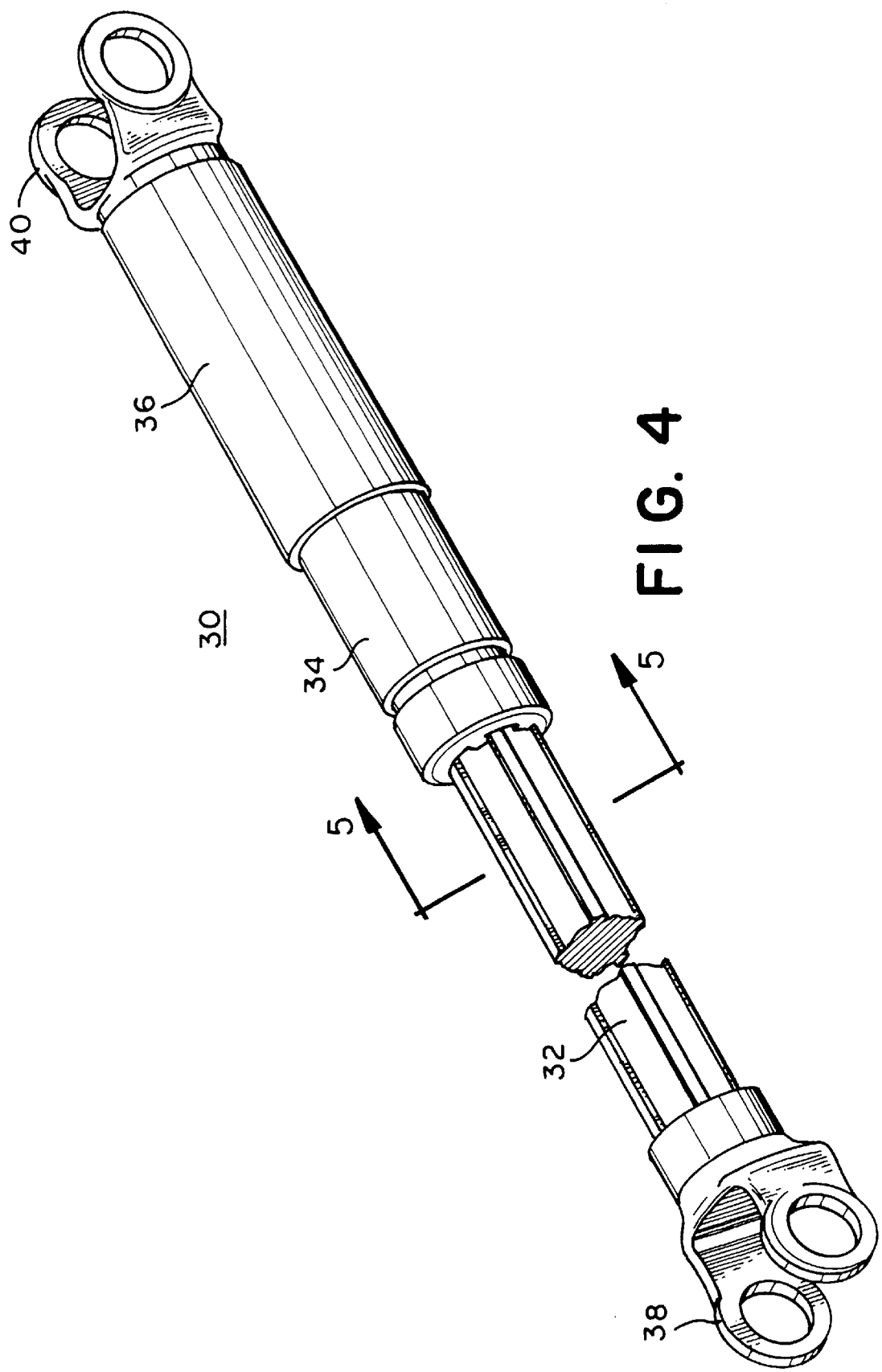
FIG. 4 is a perspective view of another embodiment of the invention.

Referring to FIG. 4 there is shown a modification of an adjustable length telescoping radial free motion driveline 30 utilizing splined shafting having a driven end and a driving end embodying the present invention. The driveline 30 includes an elongated shaft 32 having a predetermined splined external cross-sectional configuration, FIG. 5, and an elongated sleeve 34 having a predetermined splined internal cross-sectional configuration, FIG. 5, complementary to the external configuration of the shaft. The internal configuration of the sleeve 34 is larger than the external configuration of the shaft 32 to permit the shaft 32 and the sleeves 34 to telescope with respect to each other. The internal configuration of the sleeve 34 is shaped to permit the shaft 32 to rotate through a predetermined angle B, FIG. 5, with respect to the sleeve 34 and thereafter to rotate with the sleeve. With this arrangement a fixed amount of radial free motion corresponding to the predetermined angle B is provided between the shaft 32 and the sleeve 34 to compensate for any misalignment between a driving means and a driven means to which the driven end of the driving end of the driveline 30 are to be connected and after connection permitting the driveline to elongate or shorten while maintaining a fixed radial alignment.

As pointed out above in a telescoping driveline, either end of the driveline may be the driven end or the driving end depending upon which end is connected to the driving means and which end is connected to the driven means. In a telescoping driveline such as driveline 30 the shaft 32 is usually the longer member and the sleeve 34 is the shorter member of the driveline. By way of example, the shaft 32 may vary in length from about 2 to 3 feet depending upon the application whereas the sleeve 34 is frequently shorter varying from 1 to 2 feet in length. As may be seen in FIG. 4, one end of the sleeve 34 is secured to one end of a tubular member 36. The tubular member 36 may be secured to the sleeve 34 by any suitable means such for example by welding. The ends of drivelines are usually connected to universal joints. In FIG. 4, the end of the shaft 32 remote from the sleeve 34 is connected to a universal yoke 38 and the other end of the tubular member 36 is connected to a universal joint yoke 40 for connecting the driving end and the driven end of the driveline to the driving means and driven means.

Figure 5:
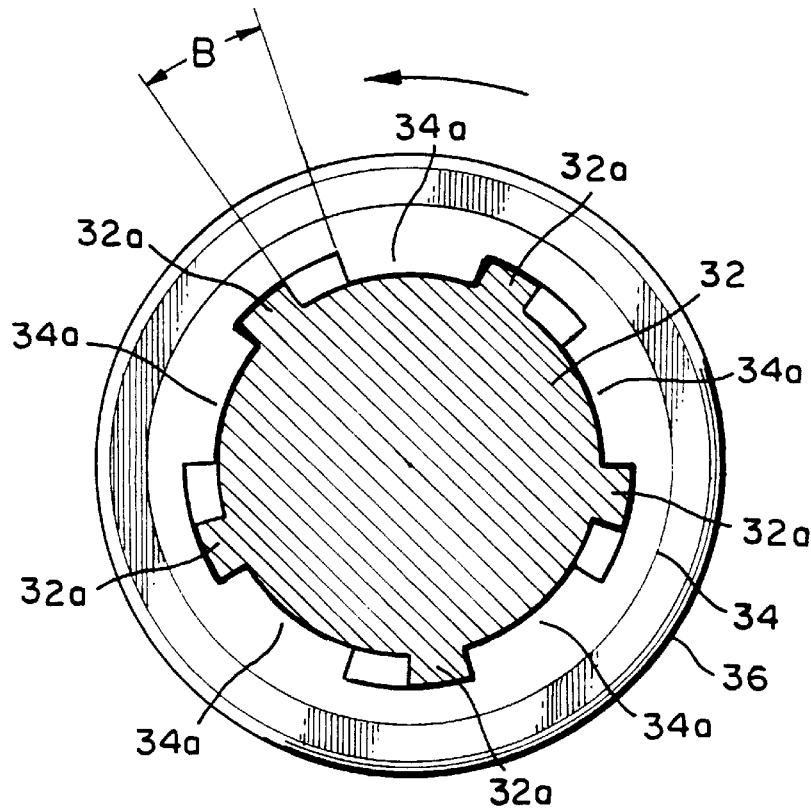
FIG. 5 is a cross-sectional view taken along the lines 5—5 in FIG. 4.

Referring to FIG. 5, it will be seen that the shaft 32 is provided with an external splined cross-sectional configuration. The externally splined shaft 32 is provided with a plurality of teeth 32a. The sleeve 34 is provided with an internally splined cross-sectional configuration having the same number of teeth 34a as the shaft 32. The spacing of the teeth 32a on the shaft 32 is larger than the spacing of the teeth 34a on the sleeve 34 by the amount of said predetermined angle, wherein the teeth 32a on the shaft 32 engage the teeth 34a on the sleeve 34 when the shaft 32 is rotated through the predetermined angle. In FIG. 5 the shaft 32 and the sleeve 34 have each been illustrated as having five teeth. The spacing between the teeth on the shaft 32a and the teeth 34a on the sleeve is greater by an amount corresponding to the predetermined angle. In a preferred form of the invention, this spacing is approximately 18° to 20°.

As shown in FIG. 5 when the shaft 32 is rotated counter clockwise in the direction of the arrow, the forward edges of the shaft teeth 32a will engage the rear edges of the sleeve teeth 34a. Thereafter, the shaft 32 and the sleeve 34 rotate together. The predetermined angle of rotation is illustrated by the angle B in FIG. 5. In FIG. 5 the shaft 32 has rotated through the angle B from the position of the shaft shown in FIG. 6.

Figure 6:
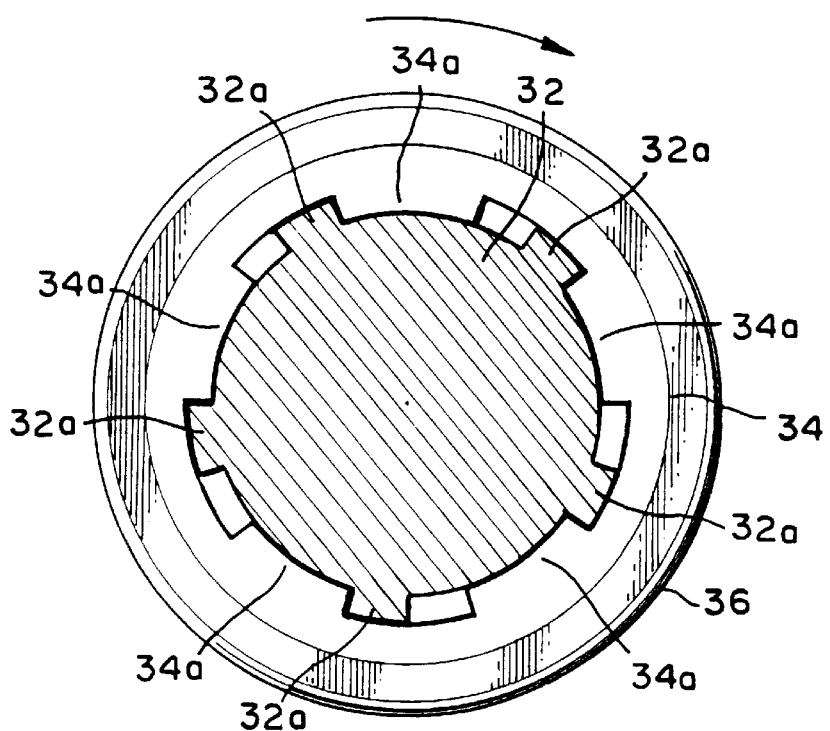
FIG. 6 is a cross-sectional view similar to FIG. 5 with the shaft rotated in the direction of the arrow through the predetermined angle shown in FIG. 5.

When the shaft 32 is rotated in the clockwise direction as shown by the arrow in FIG. 6, the shaft 32 has rotated through the predetermined angle corresponding to angle B shown in FIG. 5. At this time, the opposite sides of the teeth 32a of the shaft engage the opposite sides of the teeth 34a of the sleeve and the shaft 32 and the sleeve 34 rotate together. Thus it will be seen that a fixed amount of radial free motion corresponding to the predetermined angle B is provided between the shaft 32 and the sleeve 34 to compensate for any misalignment between the driving means and the driven means to which the driven end and the driving end of the driveline are to be connected and after connection permitting the driveline to elongate or shorten while maintaining a fixed radial alignment.

While there has been described a preferred embodiment of the invention, it will be understood that further modifications may be made without departing from the spirit and scope of the invention as set forth in the appended claims.

What is claimed is:

1. An adjustable length telescoping radial free motion driveline having a driven end and a driving end comprising an elongated shaft having a predetermined external cross-sectional configuration uniform throughout the length thereof, an elongated sleeve having a predetermined internal cross-sectional configuration uniform throughout the length thereof complimentary to the external configuration of said shaft providing a loose fit therebetween to permit said shaft and said sleeve to telescope freely with respect to each other, and said internal configuration of said sleeve being shaped to permit said shaft to rotate through a predetermined angle with respect to said sleeve and thereafter to engage and rotate with said sleeve; whereby a fixed amount of radial free motion corresponding to said predetermined angle is provided between said shaft and said sleeve to compensate for any misalignment between a driving means and a driven means to which the driven end and driving end of said driveline are to be connected and after connection permitting the driveline to elongate or shorten while maintaining a fixed radial alignment.

2. An adjustable length telescoping radial free motion driveline according to claim 1 wherein said predetermined angle is approximately 18° to 20°.

3. An adjustable length telescoping radial free motion driveline according to claim 1 wherein one end of said sleeve is secured to one end of a tubular member.

4. An adjustable length telescoping radial free motion driveline according to claim 1 wherein said shaft has a substantially square external cross-sectional configuration.

5. An adjustable length telescoping radial free motion driveline according to claim 1 wherein said shaft is provided with an external splined cross-sectional configuration.

6. An adjustable length telescoping radial free motion driveline according to claim 3 including a pair of universal joint yokes and where the end of said shaft remote from said sleeve is connected to one of said universal joint yokes and wherein the other end of said tubular member is connected to the other of said universal joint yokes for connecting the driving end and driven end of said driveline to the driving means and driven means.

7. An adjustable length telescoping radial free motion driveline according to claim 4 wherein said shaft having a substantially square external cross-sectional configuration includes four sides and two pairs of diagonally opposite arcuate corners located on a circle having a first diameter, said sleeve having an internal substantially square cross-sectional configuration including two pairs of diagonally opposite arcuate corners located on a circle having a second diameter larger than said first diameter, a pair of flat surfaces interconnecting said arcuate corners of said sleeve, each pair of said flat surfaces extending inwardly toward the center of said sleeve, each side of said shaft engaging a corresponding one of said flat surfaces in each pair when said shaft is rotated through said predetermined angle.

8. An adjustable length telescoping radial free motion driveline according to claim 5 wherein said externally splined shaft has a plurality of teeth, said sleeve having an internally splined cross-sectional configuration having the same number of teeth as said shaft, and the spacing of said teeth on said shaft being greater than the spacing of said teeth on said sleeve by an amount equal to said predetermined angle, wherein said teeth on said shaft engage said teeth on said sleeve when said shaft is rotated through said predetermined angle.

9. An adjustable length telescoping radial free motion driveline according to claim 5 wherein said shaft provided with an external splined cross-sectional configuration has five teeth, said sleeve having an internally splined cross-sectional configuration having the same number of teeth as said shaft, the spacing of said teeth on said shaft being twice the spacing of said teeth on said sleeve, wherein said teeth on said shaft engage said teeth on said sleeve when said shaft is rotated through said predetermined angle.

10. An adjustable length telescoping radial free motion driveline according to claim 8 wherein said predetermined angle is approximately 18° to 20°.

11. An adjustable length telescoping radial free motion driveline having a driven end and a driving end comprising an elongated shaft having a predetermined external cross-sectional configuration uniform throughout the length thereof, an elongated sleeve having a predetermined internal cross-sectional configuration uniform throughout the length thereof complementary to the external configuration of said shaft, said internal configuration of said sleeve being larger than the external configuration of said shaft providing a loose fit therebetween to permit said shaft and said sleeve to telescope freely with respect to each other, and said internal configuration of said sleeve being shaped to permit said shaft to rotate through a predetermined angle with respect to said sleeve and thereafter to rotate with said sleeve, wherein said shaft is provided with an external splined cross-sectional configuration having a plurality of teeth, said sleeve having an internally splined cross-sectional configuration having the same number of teeth as said shaft, and the spacing of said teeth on said shaft being greater than the spacing of said teeth on said sleeve by an amount equal to said predetermined angle, wherein said teeth on said shaft engage said teeth on said sleeve when said shaft is rotated through said predetermined angle, whereby a fixed amount of radial free motion corresponding to said predetermined angle is provided between said shaft and said sleeve to compensate for any misalignment between a driving means and a driven means to which the driven end and the driving end of said driveline are to be connected and after connection permitting the driveline to elongate or shorten while maintaining a fixed radial alignment.

12. An adjustable length telescoping radial free motion driveline according to claim 11 wherein said predetermined angle is approximately 18° to 20°.

* * * * *